Patented July 11, 1950

2,514,734

UNITED STATES PATENT OFFICE 2,514,734

MANUFACTURE OF RUBBERLIKE MATERIALS

Hans Paul Wagner, Atlanta, Ga.

No Drawing. Application January 19, 1945,
Serial No. 573,634

8 Claims. (Cl. 260—79.1)

This invention relates to manufacture of rubber-like materials; and it comprises a process of making synthetic materials having many of the properties of natural rubber, which comprises preparing a sulfur-sulfide dispersion by mixing sulfur with an aqueous solution of an alkali metal monosulfide in the proportions of about 0.85 to 0.975 part of sulfide to 1 part of sulfur, the temperature being held within the range of about 80° to 210° F. and the maximum time of preparation varying correspondingly between about 6 hours to 60 minutes, reacting in a closed reaction vessel from about 1.1 to 1.25 parts of ethylene dichloride with the freshly prepared sulfur-sulfide dispersion at temperatures within the range of about 140° to 210° F. in corresponding maximum reaction times of about 120 to 10 minutes, and recovering the resulting rubber like material from the reaction products. The invention also includes the rubber-like material produced by the said process, said material being a resilient product insoluble in water and organic solvents, having a tensile strength when compounded and cured ranging from about 700 to 1800 pounds per square inch, a tear resistance of up to about 350 pounds, a hardness of from about 45 to 90, and an elongation of from about 150 to 600 per cent, said material containing from about 72 to 77 per cent of sulfur, having a brittle point ranging from about $+5$ to $-10$ F. and a specific gravity of about 1.4 to 1.55, depending upon the compounding ingredients, being non-corrosive and stable even upon heating, being substantially odorless and capable of being milled, compounded and otherwise treated in all respects like natural rubber; all as more fully hereinafter set forth and as claimed.

This application is a continuation-in-part of my two copending applications, Serial Numbers 480,690 (now abandoned), and 500,421 (now abandoned), filed March 26, 1943 and August 28, 1943, respectively. The present application describes a process which represents an extension and, in some respects an improvement upon the processes described in these prior applications.

Many different synthetic rubbers have been proposed in the art but none has been able to compete on a cost basis with natural rubber and very few have possessed physical properties, such as tensile strength, resiliency and tear resistance, which are comparable with natural rubber. Most of these processes have required the use of complicated and expensive corrosion-resistant equipment constructed of critical materials, which has seriously delayed their manufacture.

I have discovered what appears to be an ideal solution for these difficulties in a process which is as simple as any which has been proposed heretofore, and which at the same time requires less equipment. And my rubber can be produced at a fraction of the cost of prior synthetic rubbers. Moreover the rubber produced by this new method compares favorably in physical properties with most of the prior synthetic rubbers regardless of cost.

My new method comprises reacting together in a closed reaction vessel ethylene dichloride with a solution or dispersion of sulfur in an alkali metal monosulfide solution which is prepared in such fashion that the formation of polysulfides is prevented or at least reduced to an insignificant amount. The temperature and time of heating are so controlled that the solution produced is unstable and capable upon standing of depositing substantially all of its sulfur content in excess of the monosulfide. This can be used as a test to determine the suitability of a sulfur-sulfide solution for the production of my gum. A polysulfide solution, in contrast, is stable and deposits little or no sulfur on standing. Polysulfide solutions are prepared usually by refluxing a mixture of sulfur in a monosulfide solution for several hours and an excess of caustic in the solution promotes the formation of the polysulfide. In contrast, in the making of my sulfur-sulfide dispersion, the mixture of sulfur and monosulfide solution should not be boiled and should be heated to a temperature and for a time only sufficient to disperse the sulfur. When a maximum solution temperature of 210° F. is employed, dispersion of the sulfur takes only about 20 to 30 minutes. An open or closed vessel can be used. Surprisingly, I have found that, if this dispersion is permitted to stand for a period of about 12 hours or more, it produces a decidedly inferior product even if any sulfur deposited out of the solution is redispersed by heating. In other words, the sulfur-sulfide dispersion should be reacted with the ethylene dichloride while in a freshly prepared condition. Another surprising fact is that the reaction with ethylene dichloride must take place in a closed reaction vessel i. e. under superatmospheric pressure, in order to produce a satisfactory product. The temperatures and times employed in this reaction should also be maintained as low and as short as is consistent with economical operation. If the temperature during the reaction rises much above 210° F. and is maintained at this temperature for any considerable period of time, for example, an inferior product results.

I have found that the most satisfactory operating temperatures are within the range of about 160° to 170°, with cooling being employed if necessary to prevent the temperature rising above this range. At these temperatures the reaction can be completed within about 15 to 25 minutes, although a reaction period of about 90 minutes does no harm. The pressure at these temperatures usually rises to within the range of about 7 to 20 pounds.

It is my theory that the chemical reaction produced between ethylene dichloride and my freshly prepared sulfur-sulfide dispersion involves a reaction of the hydrosulfide group and sulfur, with the production of a ring polymer. One manner in which such a reaction might take place is illustrated in the following equations:

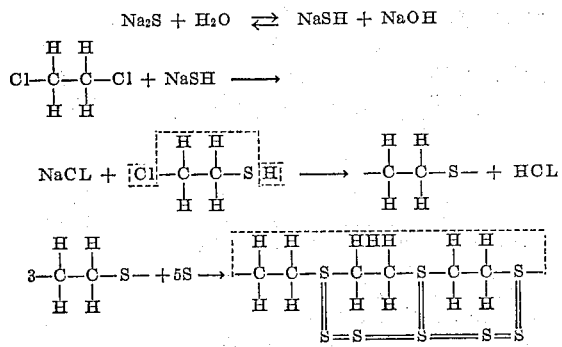

In the above equations, it is indicated that 3 molecules of ethylene dichloride combine with 3 hydrosulfide groups and with 5 atoms of molecular sulfur. This agrees with the fact that the product produced by this reaction contains approximately 75 per cent sulfur.

While I am able as yet to offer no definite proof that the reaction takes place as indicated, at least some support is given to the theory that the hydrosulfide group is involved in the reaction by the fact that the end product reacts chemically with dithio carbamates. If the crude gum is reacted with these compounds, a soft product is produced and even after precuring, the dithio carbamates act as softeners or plasticizers. More important they produce an important stabilizing effect on the product and they substantially eliminate the production of lachrymatory gases. It is, of course, well recognized that the softeners, which are most effective in producing softening effects in various plastics, usually have structures which are similar to those of the plastics. And since the dithio carbamates contain a hydrosulfide group this at least indicates that the reaction in question may involve a reaction of the hydrosulfide group.

That a fundamentally different reaction is involved than in the production of the so-called polysulfide plastics is shown clearly by the results obtained in the following two comparative tests which were conducted with the identical materials used in the same quantities, the only difference being that in making the polysulfide plastic the sulfur was boiled with the sodium sulfide solution to form a polysulfide prior to reacting the solution with the ethylene dichloride.

*Example 1*

New process.—A mixer was employed which was equipped with a heating coil and having a capacity of 160 gallons. 80 gallons of water were introduced into this mixer and 265 pounds of commercial sodium monosulfide were added, this monosulfide containing 61 per cent or 162 pounds of $Na_2S$, with sodium thiosulfate and sodium carbonate being the principle impurities aside from water. The mixture was heated and agitated to dissolve the sulfide which took about 10 minutes. At this point 180 pounds of a commercial, ground flour of sulfur were added, analyzing 99½ per cent sulfur. Heating was continued until the sulfur dispersed or dissolved, the temperature being maintained at about 200° F. during this procedure, this taking about 20 minutes. The solution was introduced into a closed reaction vessel equipped with cooling coils and cooled to 165° F. At this point 210.6 pounds of ethylene dichloride were added in quantities of about 1 gallon at a time, the solution being continuously agitated during this operation, and maintained under a pressure of from 10 to 15 pounds. These additions were made over a period of about 1 hour, during which time the temperature was maintained at 165° F. A dark green subjacent layer was seen to form during the addition of the ethylene dichloride and, on cooling, this layer separated cleanly. The reaction vessel was then heated to higher temperatures to recover the excess unreacted ethylene dichloride. The latter came over in substantially pure condition and was recovered by condensation. When the point was reached that nothing but water came over, i. e. at a temperature of about 195° F., heating was discontinued. The aqueous liquor was decanted and the gum in the bottom of the vessel was removed and transferred to a standard rubber mill cracker, where it was thoroughly washed with water. The resulting gum was found to be resilient and rubber-like in properties, stable upon aging and capable of being compounded by standard procedures. As explained in my acknowledged copending application, this gum after compounding and curing can be heated up to about 350° F. without softening appreciably. If compounded and then molded under a pressure of 1700 pounds per square inch, it flows freely to fill all mold cavities and it can be reformed in this fashion several times without losing its favorable properties. The higher the molding pressure used the higher the density, tensile strength and tear resistance of the molded product. Substantially no disagreeable fumes are given off during molding. By proper compounding with carbon black etc. it is possible to produce materials having tensile strengths as high as 1800 pounds per square inch, with tear resistances up to 350 pounds and elongations up to 600 per cent.

*Example 2*

Polysulfide process.—In this process the same mixing vessel was employed and exactly the same chemicals, used in the same quantities as in the preceding process. But after the sulfur had been dispersed in the sulfide solution this solution was boiled under a reflux for a period of 3½ hours to produce a polysulfide solution. This solution, which was made from 80 gallons of water, 265 pounds of the same sodium sulfide and 180 pounds of the same sulfur, differed from the sulfur-sulfide solution used in Example 1 only by the fact that it had been boiled to produce a polysulfide. But when 210.6 pounds of ethylene dichloride were introduced into this solution in small proportions over a period of about an hour at a temperature of 165° F. and at a pressure of 15 pounds, quite different results were produced. The subjacent layer formed was light green in color rather than dark green. And, when it was attempted to recover the excess ethylene dichloride by heating the reaction vessel to about 195° F., there was a copious evolution of hydrogen sulfide. This made it impractical to recover the ethylene dichloride and only a small quantity came over even at 195° F., which is well above the boiling point of ethylene dichloride. Moreover the gum recovered after the aqueous liquor had been decanted was quite different in properties from the gum recovered in Example 1. This gum had a consistency comparable to that of gellied consommé and its physical properties were not unlike this material. It was not rubbery in character; it flowed readily under gravity and it could be squeezed out between the fingers. It could not be worked on a standard rubber mill cracker. It was washed with water as well as possible in the reaction vessel and then dumped into another vessel for testing.

It was found impossible to directly compare the two freshly prepared materials obtained in Examples 1 and 2 owing to the fact that the material of Example 2 could not be compounded or worked owing to its non-elastic properties. It was so soft that its hardness could not be measured. But it was found that, if this material was aged for about four weeks, its hardness increased to such an extent that working on a cracker and compounding was possible. For comparative purposes, therefore, a sample from Example 1, which had been aged for four weeks was run through a series of tests in comparison with a sample from Example 2 which had been similarly aged.

The two aged samples were compounded by milling in the following materials in the proportions indicated:

100 parts gum
10 parts zinc oxide
¾ part (Altax) (benzothiazyl disulfide)
½ part stearic acid
30 parts carbon black The stocks were pre-cured with live steam for 1 hour at 60 pounds per square inch. Test samples were pressed for 10 minutes at 225° F. at 1700 pounds per square inch in a molding press. During the compounding procedure the material from Example 2 evolved copious quantities of lachrymatory gases so that compounding was very difficult and entirely impractical in commercial practice, while the material from Example 1, in contrast produced only a slight disagreeable odor.

These compounded samples were tested and the following comparative results were obtained:

|  | Example 1 | Example 2 |
|---|---|---|
| Hardness | 64 | 60 |
| Tensile strength | 900 | 875 |
| Elongation | 507 | 525 |

It will be noted that these tests produced results which were quite similar. But the material from Example 1, if compounded in the same fashion when freshly made, would give results very close to those in the above table, whereas, in contrast, it is necessary to age the material from Example 2 from 4 to 5 weeks in order to produce these results.

Samples of the compounded materials, obtained as above, were further aged for a period of 6 weeks. At the end of this time the compounded material from Example 1 had a hardness of 65, a tensile strength of 915, and an elongation of 500. But in contrast the compounded material from Example 2 had a hardness of 95. It was approximately as hard as hard rubber and was equally as brittle. Its elasticity and all rubber-like properties had disappeared.

The above results are believed to be highly surprising. It would normally be considered that the polysulfide solution would produce the more stable product, since the polysulfide solution itself is much more stable than the sulfur-sulfide solution used in Example 1. In fact, if this sulfur-sulfide solution is not used within about 24 hours an inferior product is produced. But surprisingly the material from Example 1 is substantially stable while that from Example 2 is subject to rather rapid hardening upon aging. This is believed to demonstrate the fundamentally different chemical reactions which are produced in the two cases.

The necessity for the use of a closed reaction vessel during the reaction of the ethylene dichloride with the sulfur-sulfide dispersion is shown by the following example in which all conditions and chemicals employed were the same as in the preceding two examples except for the use of a reflux condenser during the reaction rather than a closed reaction vessel.

*Example 3*

Atmospheric pressure process.—In this process a sulfur-sulfide dispersion was prepared using the same quantities of water, sodium sulfide and sulfur and the same conditions as in Example 1. The freshly prepared dispersion was introduced into a vessel provided with cooling coils and a reflux condenser. The dispersion was cooled to 165° F. and 210.6 pounds of ethylene dichloride were introduced into the vessel in small proportions over a period of about an hour, the temperature being maintained at about 165° F. and the pressure being atmospheric. The subjacent layer formed in this manner was a light yellow, about the color of sulfur. The reaction vessel was heated to recover the unreacted ethylene dichloride, as in Example 1 and it was found that no substantial quantities of hydrogen sulfide were evolved, as in Example 2. The aqueous liquor was decanted and the yellow mass removed from the bottom of the reaction vessel. This mass was found to have a rather porous structure and to be crumbly in nature. It was thermoplastic but only slightly resilient and had no tendency to agglomerate. Its properties were such that it could not be washed on a standard rubber mill cracker. And it could not be compounded since it would not agglomerate and form a bank on the mill.

It is evident from the above examples that, in order to produce a satisfactory rubber-like product, it is necessary to employ my sulfur-sulfide dispersion in combination with the use of a closed reaction vessel during the reaction with ethylene dichloride. The reason for this is, of course, not fully understood.

I have found that many surprising results are obtained by compounding my gum with various materials. Incidentally it should be mentioned that one important advantage of my gum is that it can be compounded very quickly, even more quickly than natural rubber and substantially more quickly than the so-called polysulfide plastics. Its pigment take-up is somewhat better than natural rubber. In some cases the improvement in properties upon compounding is truly astonishing. Ferric oxide (rouge) is an advantageous compounding agent. This is believed to chemically combine with the gum. The ferric oxide can be added either to the reaction mixture or in the mill with the production of substantially the same favorable results. If about 5 per cent of ferric oxide is added to the sulfur-sulfide solution, based on the weight of this solution, the gum obtained contains about 2.2 per cent $Fe_2O_3$ by analysis. This gum is considerably more elastic, it has greater rebounce and faster recovery than gums produced without this addition. Substantially the same effect is produced if this quantity of ferric oxide is added on the mill. A still further increase in elasticity, rebounce and recovery is obtained if the addition of ferric oxide is increased up to a value of about 35 to 40 per cent. This product has been found particularly useful for making printing rolls and plates and like uses. The improvement noted upon the addition of ferric oxide is obtained when my gum is compounded with from about 2 to 40 per cent of the ferric oxide.

Carbon black can be compounded with my gum with advantageous results. Surprisingly up to 60 per cent of this compounding agent can be employed with favorable results, although I normally employ only about 25 to 45 per cent of this material. If 100 parts of my gum are compounded with 10 parts of zinc oxide, ¾ part of benzthiazyl disulfide, ½ part of stearic acid and 60 parts of carbon black, the product will have a Shore hardness of about 90 but surprisingly it will have an elongation of about 150%; a tensile strength of from 1400 to 1500 pounds per square inch and a tear resistance of 170 pounds.

Still more surprising results are obtained when my gum is subjected to the same compounding but with the addition of 2½ per cent of piperidinium pentamethylene dithiocarbamate after precuring for about 1 hour under a steam pressure of about 60 pounds per square inch. The resulting product has a hardness of 60, a tensile of 1600 to 1800 pounds per square inch and elongation of 500 to 600 per cent, a tear resistance of 300 to 350 pounds and a brittle point of −10° F. These results are highly unexpected and show the important plasticizing or softening results obtained by the use of nitrogen-substituted dithiocarbamates. I have found that any of the dithiocarbamates, which are nitrogen-substituted with organic radicals, produce valuable effects of this type. Piperidinium N-pentamethylene dithiocarbamate, hexamethylene ammonium hexamethylene dithiocarbamate and zinc N-dimethyldithiocarbamate for example, have valuable plasticizing effects when compounded in my gum. The DuPont accelerator (piperidinium N - pentamethylene dithiocarbamate) is another satisfactory compound of this type. From about 1 to 5 per cent of these compounds is effective. When 2 to 3 per cent of piperidinium pentamethylene dithiocarbamate is employed as plasticizing agent, my gum is capable of passing the Government specification for synthetic rubber. This specification requires the product to have an elongation of at least 100 per cent over the range of 0° to 150° F.

One of the most striking effects of the use of the above plasticizing agents is that they substantially eliminate the odor of my gum. Gassing in the mold is entirely eliminated. These compounds have an accelerating effect when used with natural rubbers whereas in my gum they have a plasticizing or softening effect and incidentally eliminate odor. They produce stocks which form very smooth sheets.

In one of my standard compounding procedures I employ 100 parts of gum to 10 parts of zinc oxide, ½ part of benzthiazyl disulfide, ¼ part of stearic acid and from 30 to 35 per cent of carbon black. If it is desired to coat a fabric with a skim coating of this gum, the quantity of benzthiazyl disulfide should be increased to 1½ parts and the quantity of stearic acid to ¾ part. This standard compounding procedure produces a product after curing with a tensile strength of about 1100 pounds per square inch, a Shore hardness of 60–70 and an elongation of 300–500 per cent. When 40 per cent carbon black is employed the corresponding values are 1200, 70–75 and 250–450 per cent, respectively, whereas when the carbon black is replaced by 35 per cent ferric oxide, the corresponding values are 700–900, 70–75 and up to 700 per cent elongation, respectively.

It is desirable to employ a pre-curing step after the addition of the benzthiazyl disulfide, zinc oxide and stearic acid. The carbon black can be added either before or after the pre-curing step. This pre-curing may be conducted by subjecting the gum to a live steam pressure ranging from about 40 to 70 pounds per square inch for a period of about 90 to 30 minutes. If a nitrogen substituted dithiocarbamate is used as a softening agent, this is added after the pre-curing step, at which time the carbon black may be incorporated. The pre-curing step tends to stabilize the product and eliminates all danger of gassing in the mold.

The characteristic properties of my gum can be summarized about as follows: In the cold, the gum is insoluble in water and all organic solvents, showing no appreciable swelling even in cold acetone and carbon disulfide. When compounded it has a specific gravity ranging from about 1.4 to 1.55, the latter value being obtained when compounded with iron oxide. It has no definite melting point. When the crude gum is washed with steam 6 times at 20 pounds pressure for 15 minutes, followed by draining, the resulting product softens at a temperature ranging from about 120 to 150° C. Without this steam washing the material chars before softening appreciably. The sulfur content ranges from about 72 to 77 per cent, and is usually close to 75.5 per cent. When subjected to Soxhlet extraction for a period of several days, up to about 76.5 per cent of the gum dissolves. But the residue is still rubbery in character and contains approximately the original percentage of sulfur. When compounded and cured the gum has a tensile strength ranging from about 700 to 1800, a hardness ranging from about 45 to 90, an elongation ranging from about 150 to 600%, a tear resistance ranging from 170 to 350 pounds. Without the use of a dithiocarbamate plasticizing agent, its normal brittle point is about +5° F. It can be cured under pressure in the mold and it can then be heated up to about 350° F. without softening appreciably.

While I have described what I consider to be the best operating embodiments of my invention, it is evident, of course, that various modifications can be made in the specific procedures disclosed without departing from the purview of this invention. As indicated in my acknowledged copending applications, best results are produced when the sulfur-sulfide dispersion is made using 1 part of sulfur to from about 0.85 to 0.975 part of sodium sulfide and when the ethylene dichloride is employed in proportions ranging from about 1.1 to 1.25 parts. The optimum proportion to employ is about 0.9 part of the sulfide to one part of sulfur, and to 1.17 parts of ethylene dichloride. The proportions of the reactants can, of course, be varied outside these ranges but the products thereby obtained are usually not as satisfactory. During the reaction it is important to agitate the reaction mixture rather vigorously. An agitator making from about 70 to 110 revolutions per minute is adequate. The size of the reaction vessel can be varied widely so long as the same degree of agitation is employed. One very satisfactory way of agitating the reaction vessel is to install a blower in a circulating pipe leading from the gas space of the vessel to the bottom thereof. This blower sucks off vapors from the top of the reaction mass and forces them in at the bottom, preferably through a porous plate installed at this point. This method of agitation is more effective than the conventional stirring mechanisms and speeds up the reaction.

While it is usually advantageous to make up my sulfur-sulfide dispersion by heating to temperatures somewhat below 210° F., this solution can be prepared at lower temperatures, such as 80° F. if sufficient time is afforded to disperse the sulfur. The corresponding time required varies from about 1 to 6 hours. The conversion to polysulfides is not as rapid and hence the dispersion can be held for a longer time, such as 6 hours, at these lower temperatures. It is also true that, while temperatures of 160° to 170° F. are the optimum to be used during the reaction between the sulfur-sulfide dispersion and the ethylene dichloride, it is possible to extend this temperature range considerably on both sides. At the lower temperatures the reaction is slow and may take 120 minutes or more while at the higher temperatures the reaction is almost instantaneous and can be completed within 10 minutes or even 5 minutes. At the higher temperature it is difficult to hold the temperature of the reaction vessel within limits, since the reaction is highly exothermic. It is also true that it is not advisable to extend the time of reaction any longer than necessary at these high temperatures since there is some danger of the formation of polysulfides during the reaction. It is for these reasons that I prefer to operate within the temperature range of 160° to 170° since at these temperatures the reaction is rapid but not violent and the temperature can be controlled by the use of a reasonable amount of cooling water.

Any alkali metal monosulfide can be employed in the process to make the sulfur-sulfide dispersion. The sulfur may be employed in any form but, of course, the more finely divided it is, the more readily it goes into dispersion. The quantity of water employed in the process can be varied but it is advantageous to employ minimum quantities in order that smaller reaction equipment may be employed. The sulfur-sulfide dispersion, therefore should be substantially saturated. In making up the sulfur-sulfide dispersion the sulfur and sulfide may be added simultaneously to the water although the sulfur does not become dispersed until the sulfide has dissolved.

My gum can be compounded with any of the usual compounding agents, as well as with the usual anti-oxidants, accelerators, deodorizing agents, reinforcing agents, softeners, fillers, etc. Non-freezing oils can be used to lower its brittle point. It is suitable for use in recapping tires, making rubber stamps, making bullet-proof gasoline tanks and for practically all of the conventional uses of natural rubber. Other modifications of my invention which fall within the scope of the following claims will be immediately evident to those skilled in this art.

What I claim is:

1. In the production of rubber-like products, the process which comprises dispersing about 1 part of sulfur in an aqueous solution containing about 0.9 part of sodium monosulfide, while heating the solution to a temperature within the range of 80° to 210° F. for a time only sufficient to disperse the sulfur, transferring the freshly prepared solution to a closed reaction vessel and gradually adding about 1.17 parts of ethylene dichloride while maintaining the temperature within the range of 160° to 170° F. and the pressure within the range of 7 to 20 pounds, the addition of ethylene dichloride being continued over a period not substantially exceeding 90 minutes, and recovering the rubber-like product thereby produced.

2. In the production of rubber-like materials, the process which comprises dispersing sulfur in an aqueous sodium monosulfide solution by agitating and heating to a temperature ranging from 80° to 210° F. for a time only sufficient to disperse the sulfur, from about 0.85 to 0.975 part of sodium monosulfide being employed to 1 part by weight of the sulfur, and reacting the resulting sulfur-sulfide dispersion while in freshly prepared condition with from 1.1 to 1.25 parts by weight of ethylene dichloride in a closed reaction vessel operating at superatmospheric pressures of from 7 to 20 pounds per square inch and at temperatures within the range of 140° to 210° F., the reaction taking place within a corresponding time period not substantially exceeding 120 to 10 minutes, and recovering the rubber-like product thus produced.

3. The process of claim 2 combined with the further step of compounding the rubber-like product with a sufficient amount of a dithiocarbamate which is nitrogen-substituted with an organic radical and which is selected from a group consisting of piperidinium pentamethylene dithiocarbamate, hexamethylene ammonium hexamethylene dithiocarbamate and zinc N-dimethyldithiocarbamate, to produce softening of the product.

4. The process of claim 2 combined with the further step of compounding the rubber-like product with a sufficient amount of piperidinium pentamethylene dithiocarbamate to produce softening of the product.

5. The process of claim 2 wherein the reactants are employed in the proportions of about 0.9 part of monosulfide and 1.17 parts of ethylene dichloride to 1 part of sulfur.

6. The process of claim 2 combined with the further step of compounding the rubber-like product with a sufficient amount of piperidinium pentamethylene dithiocarbamate to soften the same and from 25 to 45 per cent of carbon black.

7. A rubber-like composition of matter resulting from the process of dispersing sulfur in an aqueous sodium monosulfide solution by agitating and heating to a temperature ranging from 80° to 210° F. for a time only sufficient to disperse the sulfur, from about 0.85 to 0.975 part of sodium monosulfide being employed to 1 part by weight of the sulfur, and reacting the resulting sulfur-sulfide dispersion while in freshly prepared condition with from 1.1 to 1.25 parts by weight of ethylene dichloride in a closed reaction vessel operating at superatmospheric pressures of from 7 to 20 pounds per square inch and at temperatures within the range of 140° to 210° F., the reaction taking place within a corresponding time period not substantially exceeding 120 to 10 minutes, and recovering the rubber-like product thus produced.

8. A rubber-like composition of matter resulting from the process of dispersing about 1 part of sulfur in an aqueous solution containing about 0.9 part of sodium monosulfide, while heating the solution to a temperature within the range of 80° to 210° F. for a time only sufficient to disperse the sulfur, transferring the freshly prepared solution to a closed reaction vessel and gradually adding about 1.17 parts of ethylene dichloride while maintaining the temperature within the range of 160° to 170° F. and the pressure within the range of 7 to 20 pounds, the addition of ethylene dichloride being continued over a period not substantially exceeding 90 minutes, and recovering the rubber-like product thereby produced.

HANS PAUL WAGNER.

REFERENCES CITED

The following references are of record in the file of this patent:

UNITED STATES PATENTS

| Number | Name | Date |
| --- | --- | --- |
| 1,854,423 | Patrick | Apr. 19, 1932 |
| 1,854,480 | Mnookin | Apr. 19, 1932 |
| 1,890,191 | Patrick | Dec. 6, 1932 |
| 1,923,392 | Patrick | Aug. 22, 1933 |
| 2,026,875 | Ellis et al. | Jan. 7, 1936 |
| 2,050,583 | Orthner | Aug. 11, 1936 |
| 2,174,000 | Hills et al. | Sept. 26, 1939 |
| 2,195,380 | Patrick | Mar. 26, 1940 |
| 2,206,642 | Patrick | July 2, 1940 |
| 2,363,614 | Patrick | Nov. 28, 1944 |
| 2,379,464 | Thies | July 3, 1945 |
| 2,392,402 | Patrick | Jan. 8, 1946 |

FOREIGN PATENTS

| Number | Country | Date |
| --- | --- | --- |
| 423,444 | Great Britain | Feb. 1, 1935 |
| 446,173 | Great Britain | Apr. 20, 1935 |

OTHER REFERENCES

Kuster et al.: Zeitschrift fur Anorganische Chemie, vol. 43, 1905, pages 53, 56, 57, 58, 59, 71.

Mellor, "Comprehensive Treatise on Inorganic and Theoretical Chemistry," vol. 2, page 629, published by Longmans, N. Y., 1922.

Barron, "Modern Synthetic Rubbers," published by Van Nostrand, N. Y., 1944, 2nd ed., pages 272-289 and figure 60 facing page 275.

Thiokol Facts, vol. 2, No. 3, Aug. 1942, pages 1-7 and 10, published by Thiokol Corp., Trenton, New Jersey.